United States Patent [19]

Mattern

[11] Patent Number: 4,609,853

[45] Date of Patent: Sep. 2, 1986

[54] CAST BELL MOTOR DRIVE SYSTEM AND METHOD

[75] Inventor: Richard E. Mattern, Souderton, Pa.

[73] Assignee: Schulmerich Carillons, Inc., Sellersville, Pa.

[21] Appl. No.: 658,472

[22] Filed: Oct. 9, 1984

[51] Int. Cl.$^4$ .............................................. H02P 3/20
[52] U.S. Cl. .................... 318/363; 318/282; 116/150; 340/398
[58] Field of Search ................ 308/282, 363; 116/150; 340/398

[56] References Cited

U.S. PATENT DOCUMENTS

| | | | |
|---|---|---|---|
| 1,921,090 | 8/1933 | Muller | 318/282 |
| 2,512,912 | 6/1950 | Blackburn | 340/398 |
| 2,810,124 | 10/1957 | Merrill | 116/150 |
| 2,952,013 | 9/1960 | Buda | 340/398 |
| 3,102,975 | 9/1963 | Bailey | 318/282 |

*Primary Examiner*—David Smith, Jr.
*Attorney, Agent, or Firm*—Woodcock, Washburn, Kurtz, Mackiewicz & Norris

[57] ABSTRACT

A motor drive system and method for driving a cast bell or similar object, comprising a motor and cam switches driven by the motor which operate relays in accordance with a duration angle and a start angle respectively, the circuit of the drive system supplying power to normally provide drive energy to the bell when it is swinging through the duration angle, and to provide power to the bell following system initiation as long as the bell is within the start angle. The start angle is set to be greater than the duration angle so as to optimize steady state power delivery while ensuring power delivery at the time of initial system energization.

10 Claims, 5 Drawing Figures

CAST BELL MOTOR DRIVE SYSTEM AND METHOD

BACKGROUND OF THE INVENTION

1. Field of the Invention

This invention lies in the area of motorized bell systems and, in particular, an electric motor drive system for ringing a cast bell having automatic startup capability.

2. Description of the Prior Art

Motorized systems for swinging large cast bells have been known in the art for some time. The assignee of this invention has used a system comprising a single phase 1140 RPM, 208 VAC drive motor, with power transmission from the motor to the bell via a motor mounted sprocket, linked chain and wheel attached to the bell yoke. The system also includes two snap action switches which provide control to the motor, namely a duration switch and a direction switch. The duration switch determines the duration or angular arc through which the bell swings, while the direction switch senses the bell swing direction and reverses the position of its switch contact so as to provide energization of the motor in the direction of bell swing through the duration arc. In this manner, the motor drive and the bell momentum aid each other. When the bell has gained enough momentum to increase the arc of travel to an extent that the duration switch deenergizes the motor power, the bell soon reaches the peak of its arc and reverses its direction and starts to fall, such that the direction switch changes position. After the bell has fallen enough for the duration switch to again energize, the motor drives the bell in its new direction.

In the above system, it is noted that the duration switch provides power through an angle which is less than the arc through which the bell swings. This is similar to a clock, where power is applied to the clock pendulum for only a small portion of the pendulum travel. Of course, it requires far less power to maintain the bell in motion once it has acquired momentum, than to start it in motion. With a pendulum clock, this problem is circumvented by initially placing the pendulum in motion manually. However, for an automatic bell system, particularly for a heavy cast bell, manual starting is generally not feasible and motorized startup is required. At initiation of bell swinging, power is supplied until the motor stalls or the duration cam opens on a partial swing, at which point the bell stops and swings downward toward the rest position. This change of direction is sensed and power is caused to be applied in the reverse direction. The cycle repeats itself until the bell has achieved a normal swing arc, or condition. When swinging in its normal arc, power is disconnected when the bell passes the duration angle in its upward travel. Inertia causes the bell to travel onward until it stops and reverses its direction and power is not reapplied until the bell falls back to the duration angle limits. Thus, the change in direction does not cause application of power at that moment, but rather power is only applied again when the bell has fallen to the duration limit.

Under certain circumstances, the above-described cycle is prone to failure because the bell does not return to a position within the duration angle, or "duration window". The circumstance can arise, for example, due to high friction bearings, which prevent the bell from returning to a downward position which is within the duration limits. In a similar manner, a bell with a yoke pivot point placed very low, such as is found in bells with yokes designed for rope pull, may have instances where the bell comes to rest outside the range of the duration angle, and hence fails to restart. This circumstance can also be promoted by high wind conditions, ice formation, and other naturally occurring conditions.

A compromise solution to the restart failure problem is to apply swinging power for a greater number of angular degrees than a normal swing rate requires. This solution is obtained by providing a larger duration angle, thus giving the bell a greater chance of coming to rest within the duration window where power will be applied at the next startup. However, this solution can be implemented only to a certain extent, and is not very practical because the bell no longer swings at its normal pendulum rate but rather is driven at high speeds and has the characteristic of crashing from side to side. In other words, the compromised start condition is obtained at the sacrifice of the bell drive, or duration window. Indeed, carrying this solution too far results in the bell turning completely over.

SUMMARY OF THE INVENTION

It is an object of this invention to provide an improved motor driven cast bell system, and method of ringing a bell, having improved starting features obtained without sacrificing the optimization of the steady state bell drive. This is achieved by providing a very large start angle defining the range of positions wherein motor energy is provided to drive the bell at startup, the start angle being independent of the drive duration angle through which the bell is driven during normal operation.

In order to achieve the above object, a start switch with associated cam is added to the drive system. The duration switch also has an associated cam which defines a duration angle, the duration angle being optimized in accordance with the desired bell swing. Both the duration cam and start cam are driven through appropriate gearing from the drive motor. The start relay is combined with a circuit which provides power to lift or swing the bell one time, following which it is disabled throughout the duration of the following swing sequence. Since it is used only one swing cycle, the angle defined by the start cam can be set far wider than that defined by the duration cam which is set for normal operation. By being able to independently define a start angle, means are provided to start the bell even when it is stopped outside the normal duration limits. Further, because of the higher than normal energization angle which the start circuit applies to the bell, it is certain that the bell will fall back into the normal duration limits, so that steady state swinging can follow.

DESCRIPTION OF THE PREFERRED EMBODIMENT

Figure 1A:
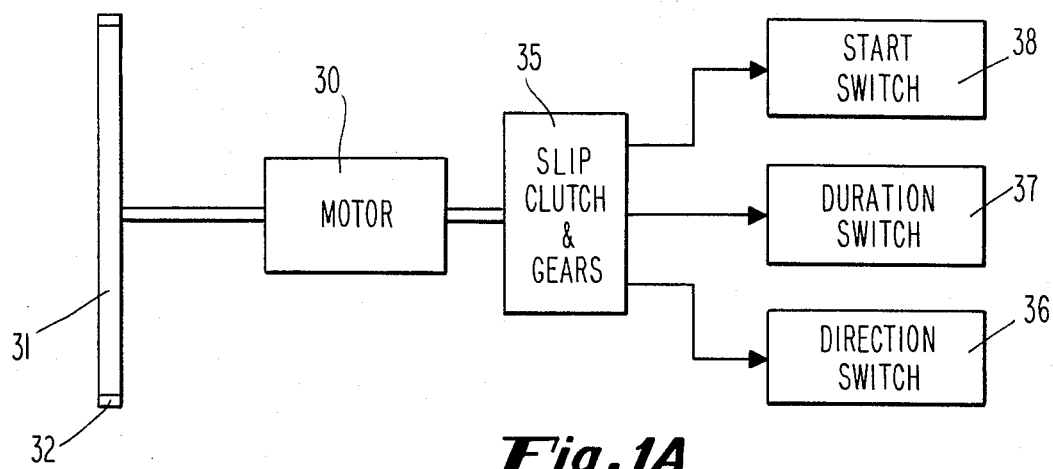
FIG. 1A is a schematic diagram showing the major components of the drive system of this invention.
Figure 1B:
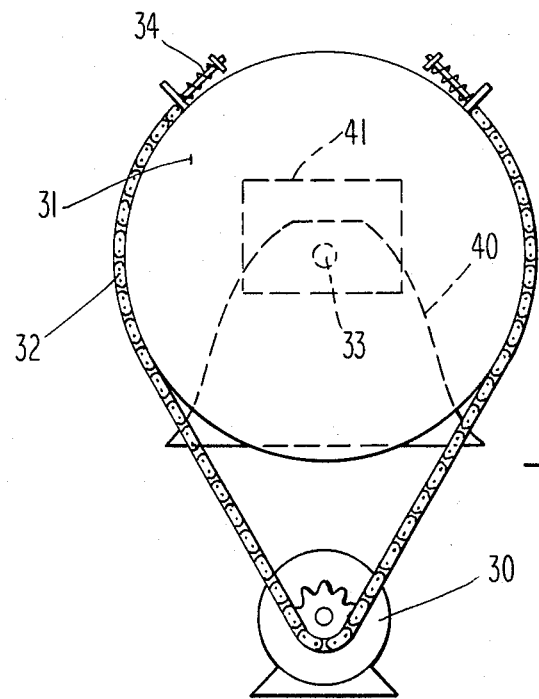
FIG. 1B is a schematic diagram showing the manner of coupling power from the electric motor to the bell.

Referring to FIGS. 1A and 1B, the main components of the motor drive system of this invention are disclosed. An electric motor 30, e.g., single phase, 208 VAC, operating at a suitable speed (R.P.M.), provides drive power through an axle and sprocket to a chain 32, which chain is coupled to drive wheel 31 so as to rotate it. The chain ends are terminated through compression springs 34 attached to the wheel, as shown in FIG. 1B. These springs absorb torque surges and hence reduce transmission of such surges to the bell. The wheel axle 33 is connected to and rotates yoke 41, which in turn carries the cast bell 40. Thus, rotation of the motor axle causes a corresponding rotation of the bell.

Figure 1C:
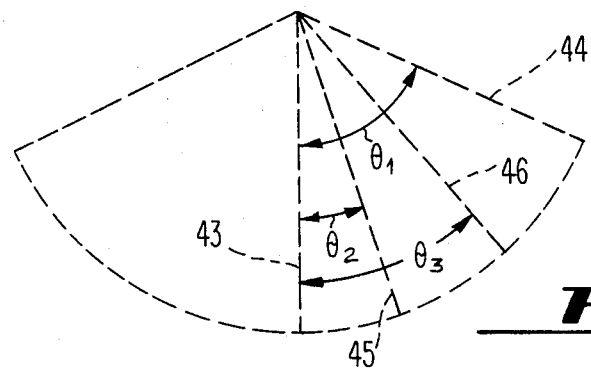
FIG. 1C is a diagrammic sketch defining the maximum bell swing $\theta_1$, the normal duration angle $\theta_2$ for supplying drive power during steady state swinging, and the start angle $\theta_3$.

The motor also drives a slip clutch and gears, as indicated at block 35. The slip clutch has an arm which is held against one limit stop or another, as a consequence of which the direction switch is switched to one of two positions. As the bell swings toward the high point of the swing as indicated by line 44 in FIG. 1C the arm does not move. However, as soon as the bell starts to move in the downward direction the slip clutch arm moves and causes the direction switch arm to change its position, thus reversing the position of the direction switch contacts. By this means, the sensing and control of bell swing direction is accomplished. The duration switch 37 is switched by a duration cam which has a surface portion defining the angle $\theta_2$, as seen in FIG. 1C. It is understood that the angles illustrated in FIG. 1C illustrate angular distance from the vertical, and apply to rotation to each side of the vertical. The duration cam is adjusted so that a swing by the bell through an angle greater than $\theta_2$ to either side of the vertical causes a contact change, and removal of power from the motor. Likewise, the start switch 38 is actuated by a start cam which has a surface portion defining the angle $\theta_3$ to each side of the vertical. The start switch 38 is thus held in a first position whenever the bell is within $\pm\theta_3$, and in a second position when the bell is above line 46, or the swing defined by $\pm\theta_3$. As described in connection with the circuit of FIG. 3, once the start relay circuit is moved to the off position during the first startup cycle, it remains in that position and thus does not influence the steady state bell swing.

Figure 2:
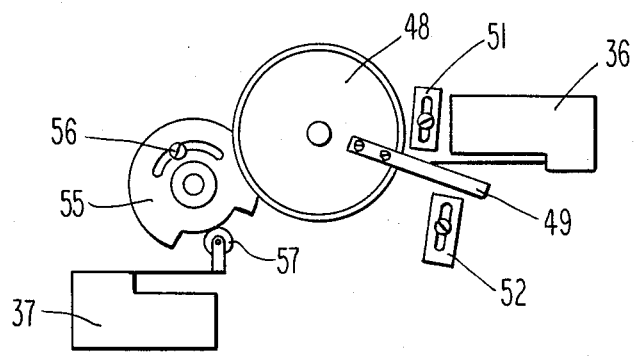
FIG. 2 is a schematic diagram showing the main components of the prior art system with respect to which this invention provides an improvement.

Referring now to the FIG. 2, there is illustrated a portion of the system which comprises the prior art arrangement, upon which the system of this invention builds. A slip clutch 48 carries an actuator arm 49, which is movable between stops 51 and 52. When the motor turns in a first direction, causing arm 49 to rotate clockwise, the arm 49 rests against stop 52 and switch 36 is in a first state corresponding to a first bell swing direction. When the bell reaches its upper limit as indicated by angle $\theta_1$, the slip clutch 48 reverses direction and arm 49 quickly moves in the other direction, thereby switching switch 36 to indicate the opposite direction. Thus, once the bell reaches its peak height and reverses direction, switch 36 is maintained in a given state until the bell swings all the way to the other side and once again reverses direction. Also as illustrated in FIG. 2 is duration cam 55, driven through suitable gearing from the motor, the cam having an indented surface which defines angle $\theta_2$. A duration cam angle set screw 56 is utilized to adjust the width of the cam angle and also to accurately position the cam surface relative to the bell vertical position. A duration switch wheel 57 rides on the surface of cam 55 and as illustrated is in a first position as long as the bell is within $\pm\theta_2$ and in a second position when it is outside of that angle, thus enabling power to be delivered to the bell only when it is within the range $\pm\theta_2$.

Figure 3:
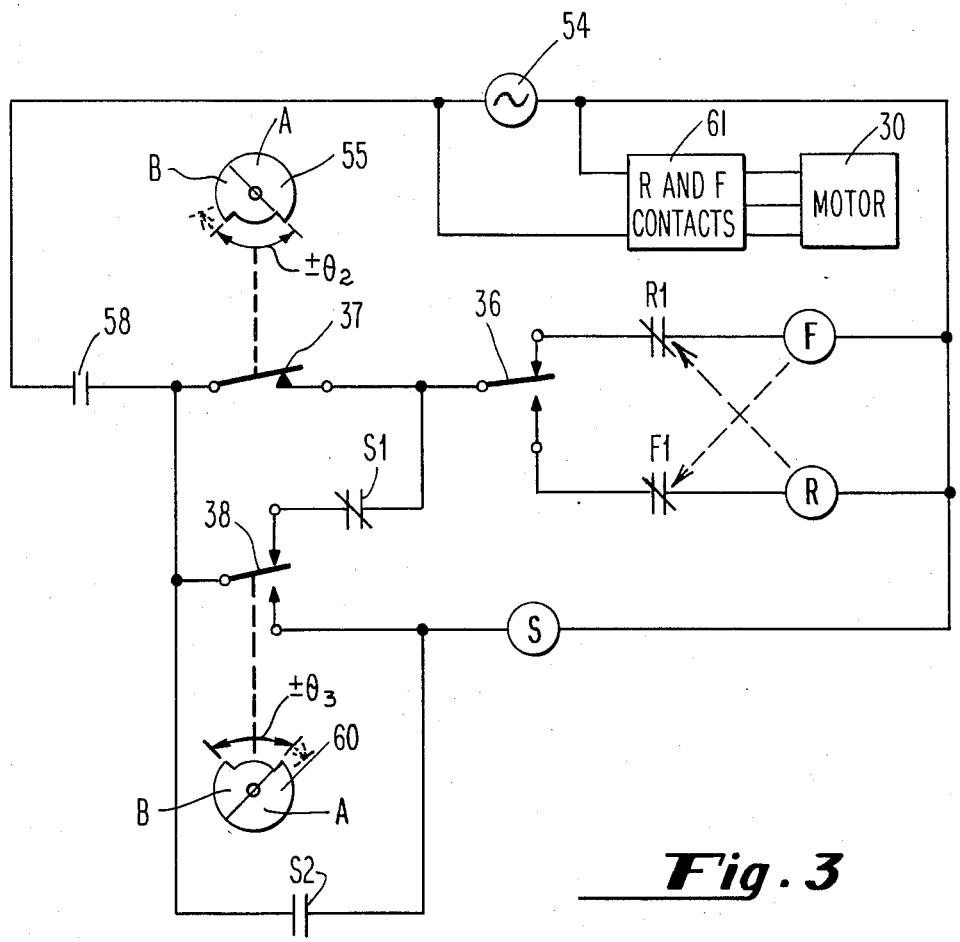
FIG. 3 is an electrical schematic diagram showing the main electrical components of the system of this invention.

The circuit of FIG. 3 shows the improvement over the prior art, which is seen in the provision of start switch 38 which is driven by a start cam 60. As illustrated, cam 60 has an indented surface which defines start angle $\theta_3$. The start angle $\theta_3$ is greater than duration angle $\theta_2$, e.g., by at least 10° and preferably by the amount of $2\theta_2$. The principle involved is that $\theta_3$ is so large as to guarantee falling within the bell rest window, but not so large as to cause the bell to lift beyond $\theta_1$. The power from source 54 is normally applied through start contact 58, duration switch 37 and direction switch 36. The position of duration switch 36 results in energization of either the forward relay F or the reverse relay R. Energization of relay R results in opening of contact R1 while energization of relay F results in opening F1. Thus, neglecting the effect of the start circuit, either the F or R relay is energized as long as but only when the bell is within the $\theta_2$ angle, with the R or F relay being energized depending upon the sensed direction. Each of relays R and F also operates contacts illustrated at block 61, which cause power to be applied to the motor 30 so as to cause it to turn in the reverse or forward direction respectively.

Switch 38 is shown in the position it takes whenever the bell is within the start angle of $\pm\theta_3$. At power start, normally open contact 58 is closed, and if the bell were outside of the duration range $\pm\theta_2$ switch 37 would be open, such that neither the reverse or forward relay would be energized and the motor would not start. However, as long as the bell is within the start angle $\pm\theta_3$, power is provided through normally closed contact S1 of relay 5. Whichever way the bell initially is driven, it will swing through a cycle until it passes out of the start range in the upward direction, at which point switch 38 reverses its position, and relay S is energized. This causes contact S1 to open, and contact S2 to close, thus holding relay S energized and keeping contact S1 open for the duration of the bell swinging which ceases after switch 58 is opened. In this manner, the start circuit provides a shunt of switch 37 only for a first cycle, or until the bell is driven in an upward direction past the extent of angle $\theta_3$, indicated by line 46 in FIG. 1C. It is seen that the angle of $\theta_3$ can be defined independently of the $\theta_2$ angle $\theta_2$ so that $\theta_2$ can be set solely in terms of steady state bell drive requirements. It is to be understood that $\theta_3$ can be made as large as $\theta_1$, the important point being that it be made sufficiently larger than $\theta_2$ so as to ensure the start of bell swinging under all of the adverse circumstances set forth above.

In practice, both cams 55 and 60 are adjustable so as to meet the requirements of the bell involved. Thus, for example, small bells require small duration angles and larger start angles, due to the fact that the smaller bell has a lesser ability to return to the duration window. As seen in FIG. 3, each of cams 55, 60 is preferrably made of two portions A and B, which portions can be rotated relative to each other so as to adjust the angle of the inner surface. An adjusting screw, not shown, is used to clamp the portions together at the desired angle. By this means the user can adjust the duration angle and the start angle, and thus optimize the system parameters in terms of the bell being driven, e.g., as a function of bell weight.

I claim:

1. An electric drive system for driving a bell or like object, the system having an electric motor operatively connected to said bell for supplying drive energy and a circuit for controlling said motor,
   - duration means operatively connected to said motor for defining a motor drive duration angle through which said motor drives said bell and duration switch means connected in said circuit for switching power to said motor as long as it is within said duration angle,
   - direction means operatively connected to said motor for sensing the direction of bell movement and direction switch means connected in said circuit for switching electric energy to drive said bell in the sensed direction,
   - start means operatively connected to said motor for starting said motor, said start means having start angle means for defining a start angle greater than said duration angle, and
   - said start means further having start switching means connected in said circuit for switching power to said motor only when said drive system is initially energized and said bell is within said start angle.

2. The system as described in claim 1, wherein said duration means comprises a duration cam mechanically connected to said motor for determining when said bell is within said duration angle, and said start means comprises a start cam mechanically connected to said motor for determining when said bell is outside of said start angle, and gear connection means for connecting each of said cams to said motor.

3. The system as described in claim 2, wherein said duration cam has a surface defining said duration angle and said start cam has a surface defining said start angle.

4. The system as described in claim 3 wherein said start angle is at least ten degrees greater than said duration angle.

5. The system as described in claim 3, wherein said start angle is at least about 2 times said duration angle.

6. The system as described in claim 3, wherein said start cam comprises means for adjusting said start angle.

7. The system as described in claim 6, wherein said duration cam comprises means for adjusting said duration angle.

8. A method of controlling the electric drive of a bell, said method having improved means for ensuring the startup of said bell drive, comprising,
   - defining a duration angle corresponding to the swing of said bell, and normally driving said bell only when it is positioned within said duration angle,
   - defining a start angle greater than said duration angle, and at startup applying energy to said motor as long as said bell is within said start angle, and thereafter applying energy to said motor only when said bell is within said duration angle.

9. The method as described in claim 6, further comprising setting said start angle to be less than the steady state maximum swing angle of the bell.

10. The method as described in claim 8, comprising adjusting said start angle as a function of the weight of said bell.

* * * * *